(12) United States Patent
Thomas

(10) Patent No.: US 11,987,380 B2
(45) Date of Patent: May 21, 2024

(54) CONTROL SURFACE ELEMENT SKEW AND/OR LOSS DETECTION SYSTEM

(71) Applicant: Moog Wolverhampton Limited, Wolverhampton (GB)

(72) Inventor: Glynn Thomas, Wolverhampton (GB)

(73) Assignee: Moog Wolverhampton Limited, Wolverhampton (GB)

( * ) Notice: Subject to any disclaimer, the term of this patent is extended or adjusted under 35 U.S.C. 154(b) by 430 days.

(21) Appl. No.: 16/973,883

(22) PCT Filed: May 30, 2019

(86) PCT No.: PCT/GB2019/051473
§ 371 (c)(1),
(2) Date: Dec. 10, 2020

(87) PCT Pub. No.: WO2019/239103
PCT Pub. Date: Dec. 19, 2019

(65) Prior Publication Data
US 2021/0261269 A1 Aug. 26, 2021

(30) Foreign Application Priority Data
Jun. 11, 2018 (GB) .................................... 1809573

(51) Int. Cl.
*B64D 45/00* (2006.01)
*G01L 5/10* (2020.01)

(52) U.S. Cl.
CPC ............ *B64D 45/0005* (2013.01); *G01L 5/10* (2013.01); *B64D 2045/001* (2013.01)

(58) Field of Classification Search
CPC ....................... B64D 2045/001; B64D 45/0005
See application file for complete search history.

(56) References Cited

U.S. PATENT DOCUMENTS

| 5,680,124 A | 10/1997 | Bedell |
| 5,686,907 A | 11/1997 | Bedell et al. |

(Continued)

FOREIGN PATENT DOCUMENTS

| EP | 0726201 A1 | 8/1996 |
| EP | 1088753 A2 | 4/2001 |

(Continued)

OTHER PUBLICATIONS

European Patent Office, International Search Report and Written Opinion of the ISA from International Patent Application No. PCT/GB2019/051473, dated Aug. 5, 2019.

*Primary Examiner* — Feba Pothen
(74) *Attorney, Agent, or Firm* — Harter Secret & Emery LLP

(57) ABSTRACT

An aircraft control surface skew and/or loss detection system including an aircraft wing structure having a fixed part and at least two control surface elements wherein the at least two control surface elements are configured to be moveable relative to the fixed part. The detection system also includes a cable operably connected to each of the at least two control surface elements such that a tensile force is applied to the cable upon skew and/or loss of one of the control surface elements. The detections system has a sensor assembly including a first part and a second part, wherein one of the first and second parts has a sensor and wherein the cable is coupled to the second part such that skew and/or loss of one of the control surface elements causes movement of the second part relative to the first part. The sensor is configured to detect a first relative position of the first and second parts indicative of the wing structure supporting a load, and a second relative position of the first and second parts indicative of the wing structure being supported.

26 Claims, 11 Drawing Sheets

(56) References Cited

U.S. PATENT DOCUMENTS

| | | | | |
|---|---|---|---|---|
| 6,466,141 B1 * | 10/2002 | McKay | ................... | B64C 13/00 |
| | | | | 340/963 |
| 2009/0048689 A1 * | 2/2009 | Pelton | ................ | B64D 45/0005 |
| | | | | 701/1 |
| 2010/0064823 A1 | 3/2010 | Schlegel et al. | | |
| 2013/0068893 A1 * | 3/2013 | Thomas | ............. | B64D 45/0005 |
| | | | | 244/194 |

FOREIGN PATENT DOCUMENTS

| | | | | |
|---|---|---|---|---|
| EP | 2555979 | B1 | 6/2016 | |
| GB | 2469910 | A | 11/2010 | |
| JP | 2010247602 | A * | 11/2010 | ......... B64D 45/0005 |

\* cited by examiner

73

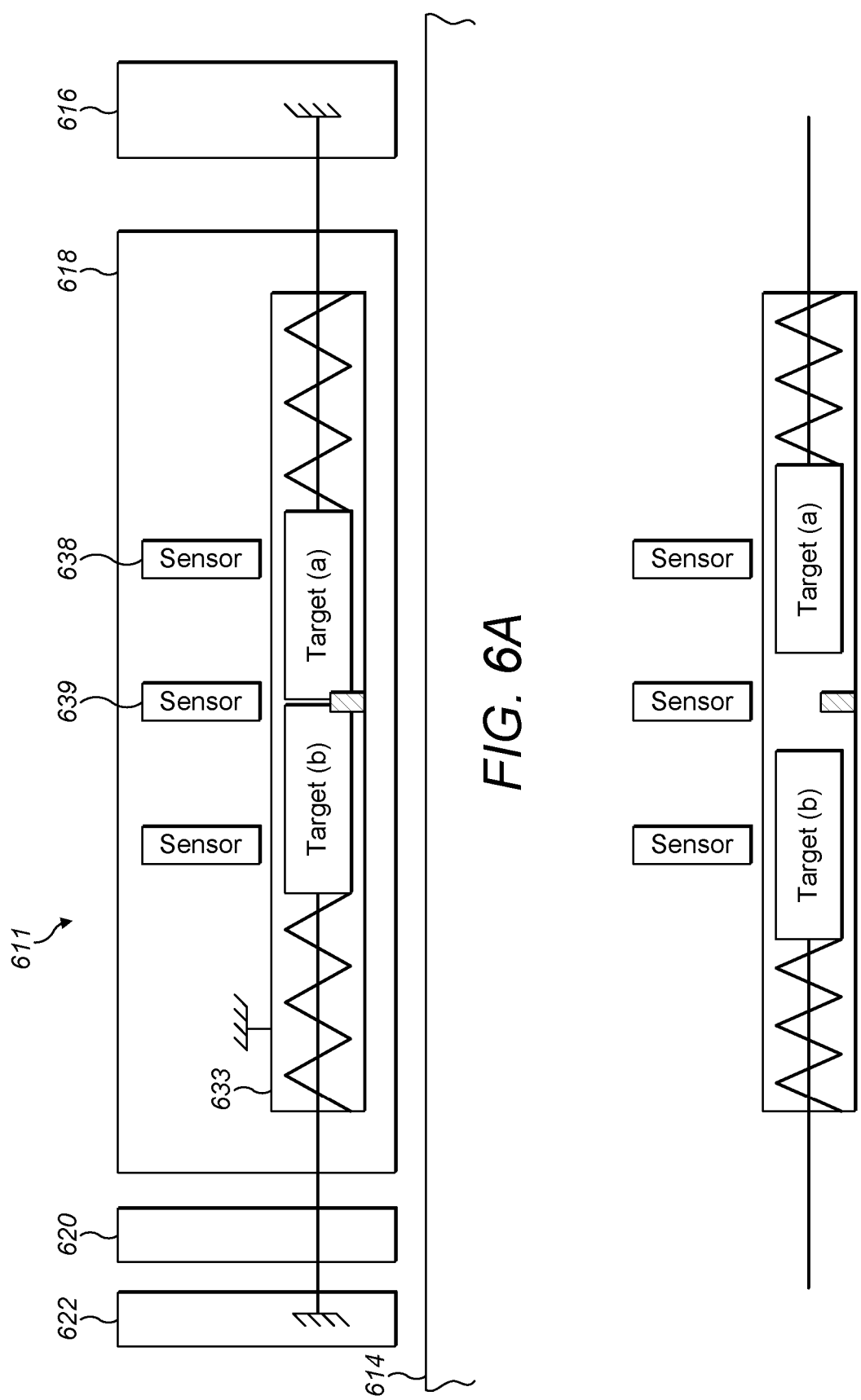

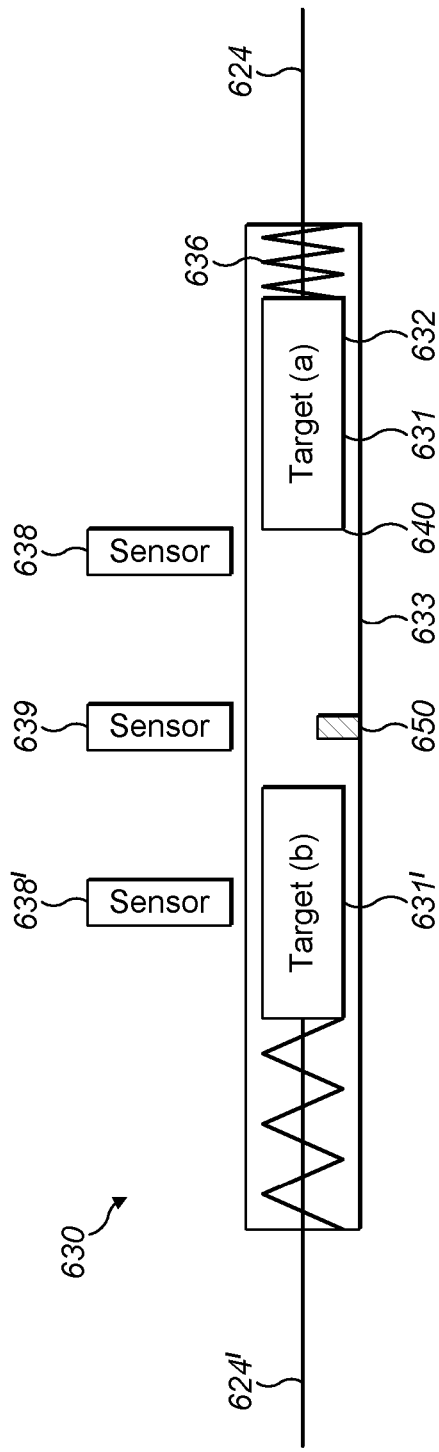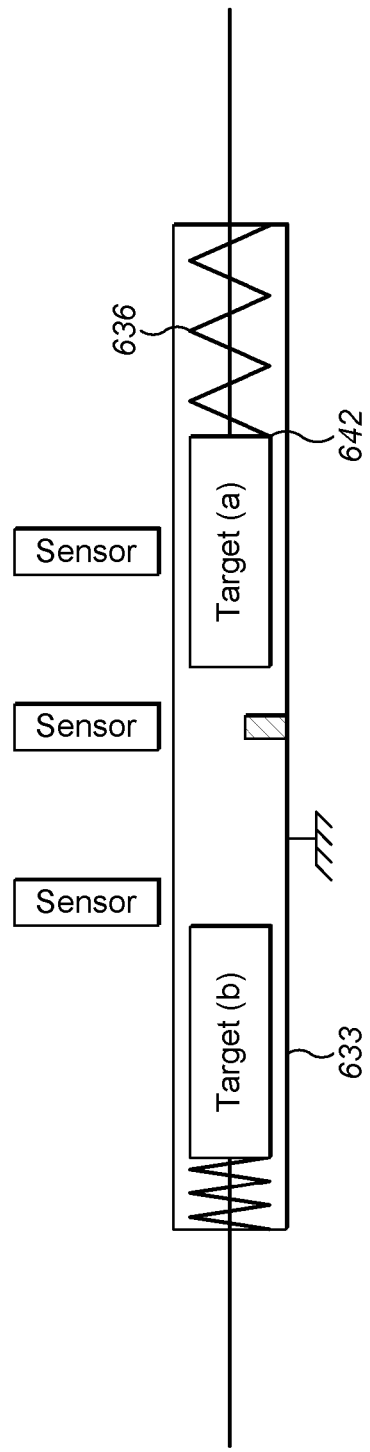

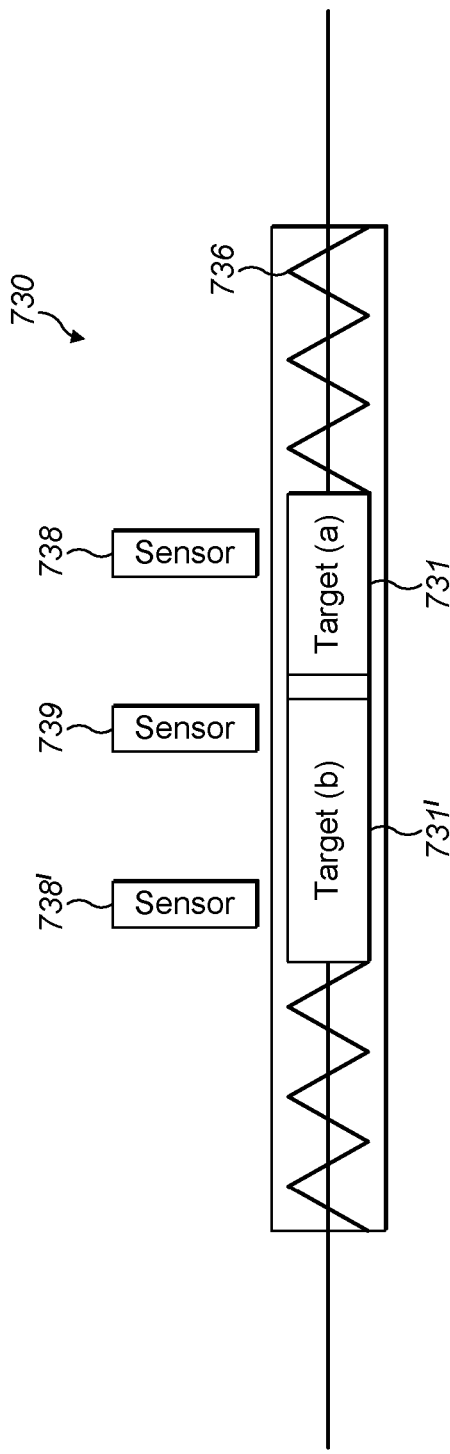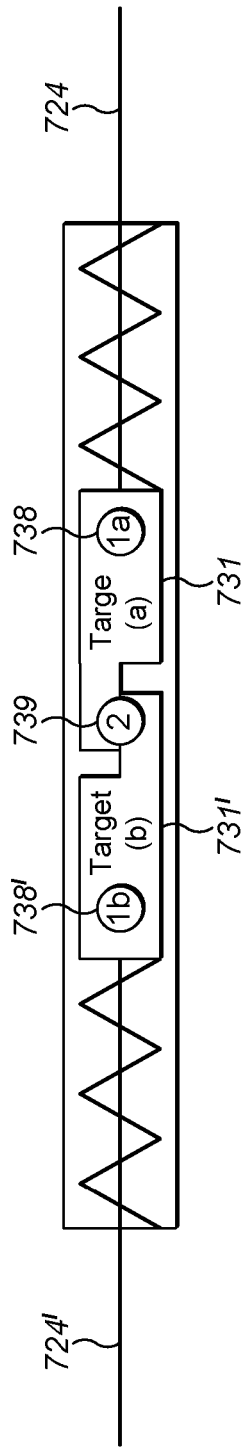

CONTROL SURFACE ELEMENT SKEW AND/OR LOSS DETECTION SYSTEM

The present invention is concerned with a control surface element skew and/or loss detection system. More specifically, the present invention is concerned with an improved cable-type skew and/or loss detection system for use with slats and flaps of aircraft wings.

Aircraft wings typically include a set of actuable control surface elements. These control surface elements define control surfaces (also known as auxiliary aerofoils) which are moveable relative to the fixed wing structure in order to alter the aerodynamic characteristics of the wing. Such control surface elements include leading edge devices such as slats, and trailing edge devices such as flaps.

Typically, control surface elements are actuated at either span-wise end by two separate actuators. It is conceivable that if either of these actuators malfunctions, inconsistent actuation and skew or loss of the relevant control surface could occur. It is important that if skew or loss is detected, the relevant systems are shut down and the pilot of the aircraft is notified.

Various methods have been proposed in the prior art for providing detection of skew and/or loss of control surface elements. One such system described in U.S. Pat. No. 5,680,124 provides a cable or lanyard which is coupled to each of a series of control surface elements. The cable is put in tension in the event of skew or loss. A movement detector with a proximity sensor is provided coupled to the cable such that any movement of the cable resulting from skew and/or loss can be detected. This detector is mounted on the endmost flap or slat. It is coupled to the flap/slat electronics unit (FSEU) in the aircraft fuselage via electric cables running from the moveable control surface element through the fixed wing structure to the fuselage and to the FSEU.

A challenge in designing such systems is that relatively small deflections or movements, that are caused by wing structural deflections, dynamics of the aircraft or temperature changes, may confuse the detection system. Such spurious movements do not cause problems in the extension or retraction of the surface elements, but the confusion to the detection may result in the system unnecessarily responding to minor misalignments.

The apparatus of European Patent Number 0726201 allows serious displacement, or misalignment, of one or more adjacent surface elements to be detected during their extension or retraction, while ignoring the smaller, spurious, movements.

A problem with each of these prior art systems is that neither system enables the detection of a seized cable, or in some cases, an undetected failure of the sensor(s).

In the event of failure of the detection system, for example cable seizure, or seizure of any other component of the detection system, skew or loss can no longer be detected, which compromises the safety of the system. A check is therefore required at regular intervals to verify the cable is not seized. This is a manual operation which adds maintenance time, cost and administration effort. Aircraft regulations, particularly for commercial aircraft, are also making certification more difficult for systems which have undetected failures.

According to an aspect of the present invention there is an aircraft control surface skew and/or loss detection system including:

an aircraft wing structure having a fixed part and at least two control surface elements wherein the at least two control surface elements are configured to be moveable relative to the fixed part, a cable operably connected to each of the at least two control surface elements such that a tensile force is applied to the cable upon skew and/or loss of one of the control surface elements, and a sensor assembly having a first part and a second part, wherein one of the first and second parts has a sensor and wherein the cable is coupled to the second part such that skew and/or loss of one of the control surface elements causes movement of the second part relative to the first part, the sensor being configured to detect a first relative position of the first and second parts indicative of the wing structure supporting a load, and the sensor being configured to detect a second relative position of the first and second parts indicative of the wing structure being supported.

The sensor may be configured to detect a third relative position of the first and second parts indicative of skew and/or loss of one of the control surface elements.

The sensor may be configured to detect a fourth relative position of the first and second parts indicative of a loss of a tensile force in the cable.

The sensor may include a first sensor configured to detect when the first and second parts are within a first range of relative positions.

The first sensor may be incapable of detecting the relative positions of the first and second parts when the first and second parts are outside of the first range.

The sensor may include a second sensor configured to detect when the first and second parts are within a second range of relative positions.

The second sensor may be incapable of detecting the relative positions of the first and second parts when the first and second parts are outside of the second range.

The first range may overlap the second range.

The first range may not overlap the second range.

One of the third relative position and fourth relative position may be outside one of the first and second ranges and inside the other of the first and second ranges.

The other of the third and fourth relative positions may be inside said one of the first and second ranges and outside of said other of the first and second ranges.

The other of the third and fourth relative positions may be outside of both the first and second ranges.

The at least one sensor may include a continuous sensor.

The continuous sensor may be a linear sensor, for example a linear variable differential transformer.

The continuous sensor may be a rotary sensor, for example a rotary sensor including means to convert linear to rotary motion, such as a rack and pinion.

The continuous sensor may be a sensor that detects the continuous position of a grating.

The aircraft control surface skew and/or loss detection system may be configured such that when the sensor detects the first relative position when the wing structure is being supported is indicative of a failure of the detection system.

The aircraft control surface skew and/or loss detection system may be configured such that when the sensor detects the second relative position when the wing structure is supporting a load is indicative of a failure of the detection system.

The first part may be mounted on one of the control surface elements.

According to an alternative aspect of the present invention there is a method of operating an aircraft including an aircraft control surface skew and/or loss detection system as defined in any preceding claim including detecting an initial relative position of the first and second parts when the wing structure is supporting a load, and detecting a secondary relative position of the first and second parts when the wing structure is being supported, and thereby detecting correct alignment of the at least two control surface elements or mis-alignment of one of the control surface elements, or failure of the detection system.

Detecting failure of the detection system may include:
a) detecting loss of a tensile force in the cable, or
b) detecting an alternative failure of the detection system.

According to an aspect of the present invention there is an aircraft control surface skew and/or loss detection system including:

an aircraft wing structure having a fixed part and at least two control surface elements, wherein the at least two control surface elements are configured to be moveable relative to the fixed part;

a cable coupled to each of the at least two control surface elements such that a tensile force is applied to the cable upon skew and/or loss of one of the at least two control surface elements; and a sensor assembly having a housing, a piston and a resilient member, wherein the housing has at least one sensor and the piston has a sensor target, and wherein the cable is coupled to the piston such that skew and/or loss of one of the control surface elements causes movement of the sensor target relative to the at least one sensor resulting in the generation of at least two signals indicative of the position of the sensor target relative to the at least one sensor.

Advantageously, the provisions of at least two signals indicative of the position of the sensor target relative to the at least one sensor allows the system to detect changes in the position of different parts or regions of the sensor target and, therefore, skew or misalignment of either of the control surface elements, if the cable is broken or detached, as well as if the cable becomes seized.

The aircraft control surface skew and/or loss detection system may further include a sensor that is configured to generate a signal that is indicative of the weight of an aircraft being supported by a wheel of the aircraft.

The signal indicative of the weight of an aircraft being supported by an aircraft wheel, or not, in conjunction with the provision of signals relating to the position of the sensor target relative to the sensor facilitates the assessment of whether or not the cable is seized.

The sensor assembly may be configured to generate a signal that is indicative of movement of the cable in order to determine whether or not the cable is seized.

The sensor assembly may include a first sensor and a second sensor. Each of the first sensor and the second sensor may be associated with a different part or region of the sensor target. The first sensor may, for example, be associated with a first or a second end of the sensor target and the second sensor may, for example, be associated with the other of the first and second ends of the sensor target.

In this way, whether or not the cable is free to move and, therefore, whether the cable is seized can be determined.

The aircraft control surface skew and/or loss detection system may be configured such that when the detection system is in a normal, unloaded, aircraft on ground condition, at least one of the first sensor and the second sensor may overlap the sensor target.

By 'unloaded' condition, we refer to a condition in which the aircraft is on the ground and the weight of the aircraft is supported by the wheels, i.e. that the wings of the aircraft are unloaded. By 'loaded' condition, we refer to a condition in which the aircraft is in the air and the weight of the aircraft is supported by the wings, i.e. that the wings of the aircraft are loaded.

The aircraft control surface skew and/or loss detection system may be configured such that when the detection system is in a normal, unloaded, aircraft on ground condition, each of the first sensor and the second sensor may overlap the sensor target.

The aircraft control surface skew and/or loss detection system may be configured such that when the detection system is in a normal, unloaded aircraft on ground condition, the second sensor overlaps the sensor target and further wherein, when the detection system is in a normal, loaded aircraft in air condition, the second sensor is spaced apart from the sensor target.

The aircraft control surface skew and/or loss detection system may be configured such that when the detection system is in a normal, unloaded aircraft on ground condition, the first sensor overlaps the sensor target and further wherein, when the detection system is in a normal, loaded aircraft in air condition, the first sensor overlaps the sensor target.

The aircraft control surface skew and/or loss detection system may be configured such that when the detection system is in a normal, unloaded aircraft on ground condition, the first sensor is spaced apart from the sensor target and further wherein, when the detection system is in a normal, loaded aircraft in air condition, the first sensor overlaps the sensor target.

The at least one sensor may include a continuous sensor.

The continuous sensor may allow the detection of the position and movement of different parts or regions of the sensor target or armature.

In this way, whether or not the cable is free to move and, therefore, whether the cable is seized can be determined.

The continuous sensor may be a linear sensor, for example a linear variable differential transformer.

The continuous sensor may be a rotary sensor. The rotary sensor may include means to convert linear to rotary motion, for example a rack and a pinion.

The continuous sensor may be a sensor that detects the continuous position of a grating, for example an electromagnetic sensor or an optical sensor having a grating.

Examples of skew and/or loss detection systems according to the present invention will now be described with reference to the accompanying drawings in which:

FIGS. 6A to 6F show a schematic representation of a sensor assembly of a skew and/or loss detection system according to an alternative embodiment of the invention, FIGS. 7A and 7B show schematic representations of a sensor assembly of a skew and/or loss detection system according to an alternative embodiment of the invention.

Figure 1:
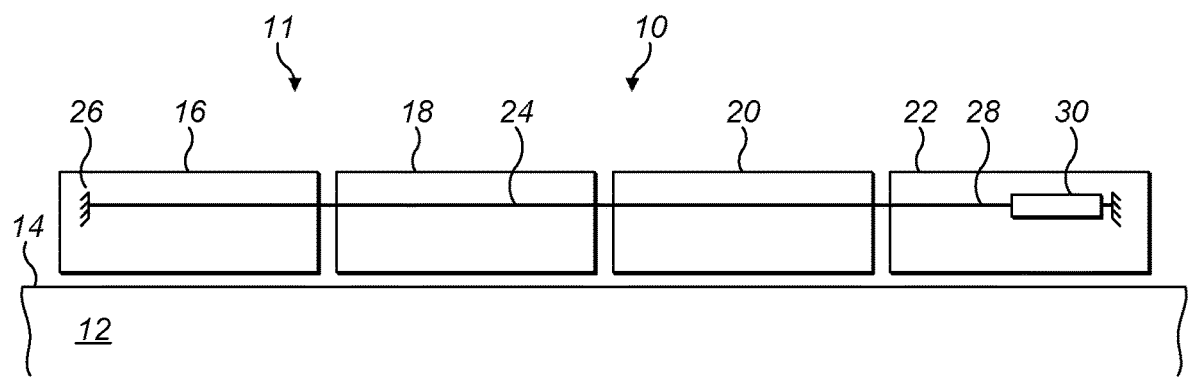
FIG. 1 is a schematic representation of a typical wing layout of a leading edge of an aircraft.

Referring to FIG. 1 a control surface element skew and/or loss detection system is shown schematically. The system 10 is shown installed on a wing 11 having a fixed wing structure 12 having a fixed leading edge 14. A plurality of control surface elements in the form of first slat 16, second slat 18, a third slat 20 and a fourth slat 22 are independently moveably mounted to the fixed wing structure 12. The method of attachment and actuation of the slats 16, 18, 20, 22 is well known in the art and will not be described further here. The overall position of the slat system is indicated by a system movement transducer, typically located at the endmost position of each wing. Under normal conditions, each of the slats 16, 18, 20, 22 move together and thus the system movement transduces system does not detect abnormal slat movement.

The system 10 includes a cable or lanyard 24 and a known skew sensor mechanism (or sensor assembly) 30. The body 33 of the sensor mechanism 30 is attached to slat 22. The cable 24 has a first end 26 and a second end 28. The cable 24 is attached to the skew sensor mechanism 30 at the second end 28 and is free to run through each of the slats 16, 18, 20, 22 and is earthed at the first end 26 to the first slat 16.

Movement of any of the slats relative to the other slats will cause tension or pulling in the cable 24, such tension being detected by the skew sensor mechanism 30.

The known skew sensor mechanism 30 is a spring loaded piston-in-cylinder arrangement and will be described in more detail with reference to FIGS. 2A to 2C.

Figure 2A:
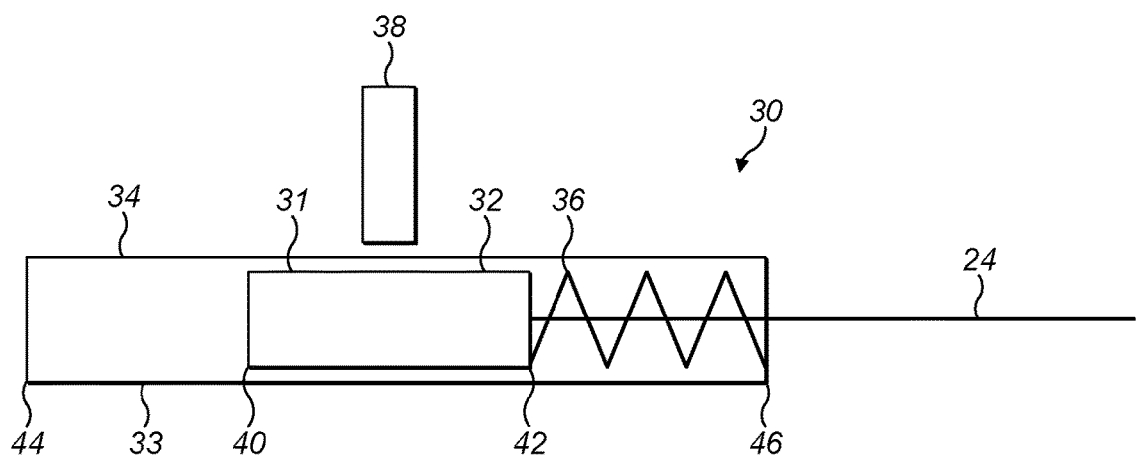
FIG. 2A is a schematic representation of an example of a sensor assembly of a known skew and/or loss detection system in a normal state with no panel skew.

With reference to FIG. 2A, the skew sensor mechanism 30 has a sensor target 31 that is provided as part of a piston 32, a body 33 in the form of a hollow cylinder (also known as a housing) 34, a resilient biasing means in the form of a spring 36 and a sensor 38. The piston 32 has a first end 40 and a second end 42. The cable 24 is connected to the second end 42 of the piston 32. The cylinder 34 has a first end 44 and a second end 46. The sensor target 31 and the piston 32 are moveable within the cylinder 34. The spring 36 is positioned between the second end 42 of the piston 32 and the second end 46 of the cylinder 34. The sensor 38 is mounted on the outside of the cylinder 34.

The sensor 38 is able to detect when the sensor target 31 of the piston 32 is in a 'target near' or 'activated' or 'ON' position when the sensor target is close to the sensor or is in a 'target far' or 'deactivated' or 'OFF' position when the sensor target is remote from the sensor. Typically, the sensor 38 is a proximity sensor and the sensor target 31 of the piston 32 is a metallic target. The proximity sensor may be an electric coil, the inclusion of which changes with the proximity or remoteness of the metallic target. Alternatively, the sensor 38 may be a Hall Effect device with a magnetic target or a switch with a mechanical target. Any suitable sensor and sensor target may be used.

The cable 24 passes through a plurality of slats, as shown in FIG. 1, and is held in tension by the spring 36 such that the sensor target 31 is proximal to the sensor 38.

The arrangement of the skew sensor mechanism 30 shown in FIG. 2A is indicative of no panel skew, i.e. the mechanism 30 is in a normal state with the wing either in a relaxed, unloaded state wherein the associated aircraft is on the ground or in a loaded state in normal flight. The sensor target 31 is in the 'target near' position. In other words, the senor target 31 is within the detection range of the sensor 38.

Figure 2B:
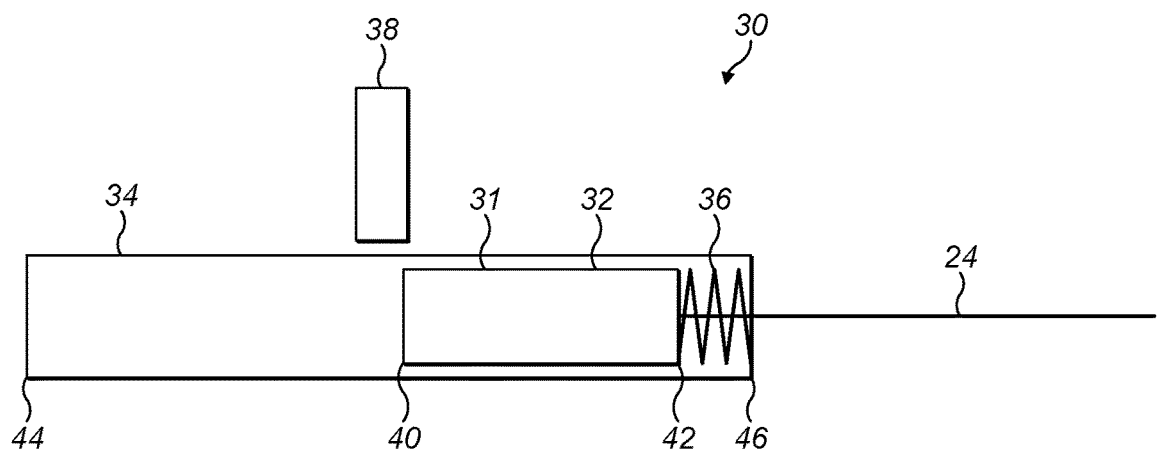
FIG. 2B is a schematic representation of the sensor assembly of FIG. 2A in a state in which panel skew has occurred.

With reference now to FIG. 2B, the arrangement of the skew sensor mechanism is indicative of panel skew (i.e. that one or more of the slats is skewed or misaligned relative to the other slats). The panel skew has caused the cable 24 to be pulled to the right, compressing the spring 36 at the second end 46 of the cylinder 34. The sensor target 31 is thus moved away from the sensor 38, which is able to detect that the sensor target 31 has moved to a 'target far' position.

The 'target far' is an indication that a failure has occurred in this case that panel skew has occurred.

Figure 2C:
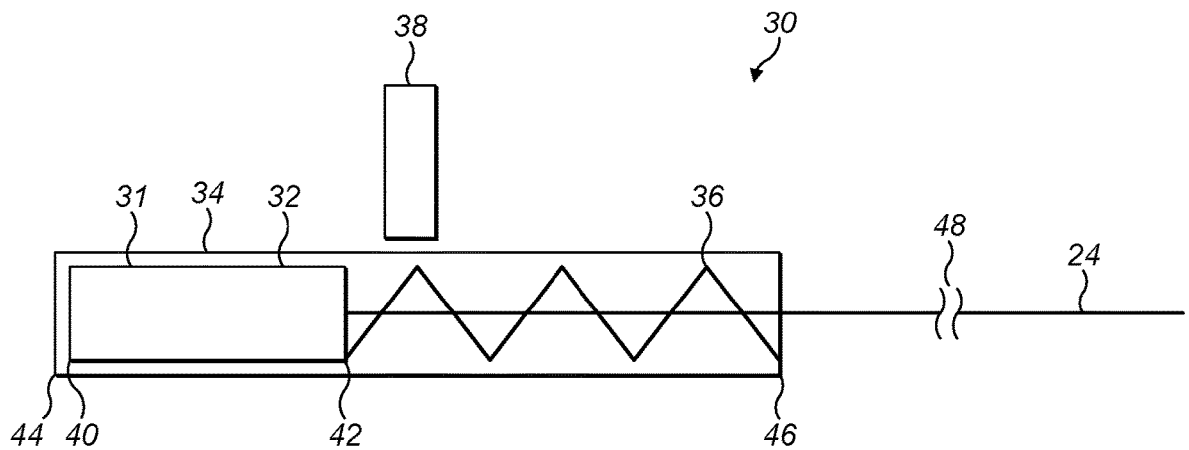
FIG. 2C is a schematic representation of the sensor assembly of 2A in a state in which cable failure has occurred.

Referring now to FIG. 2C, the arrangement of the skew sensor mechanism 30 is indicative that the cable 24 has failed (is broken or disconnected). Following a break 48 in the cable 24, the spring 36 extends, thereby allowing the sensor target 31 to move toward the first end 44 of the cylinder 34. The sensor target 31 is thus moved away from the sensor 38, which is able to detect that the sensor target 31 has moved to a 'target far' position. The 'target far' is an indication that a failure has occurred in this case that cable failure has occurred.

In each of the conditions shown in FIGS. 2B and 2C, the sensor 38 detects that the sensor target 31 is in the 'target far' position. In other words, the system 30 is not able to differentiate between skewed panels or cable failure.

The prior art system 30 of FIGS. 2A to 2C also cannot detect if either failure of the detection system has occurred, for example by seizure of the cable 24, the sensor 38, or other component of the detection system. Also, depending what type of sensor 38 is used, it cannot detect if the sensor has failed in the 'target near' state such that when there is a panel skew or cable failure resulting in the target being in a 'target far' position, the sensor still nevertheless indicates 'target near'.

Table 1 below shows various conditions, the corresponding actual sensor target position and apparent sensor target position and also when a failure is detected.

TABLE 1

| | Condition | Actual Target Position | Target Position as Indicated by Sensor | When Failure Detected |
|---|---|---|---|---|
| 1 | Normal Ground (FIG. 2a) | Near | Near | n/a |
| 2 | Normal flight | Near | Near | n/a |
| 3 | Skew (FIG. 2b) | Far | Far | Immediately |
| 4 | Cable Break (FIG. 2c) | Far | Far | Immediately |
| 5 | Cable seized when aircraft on ground | Near | Near | Failure not indicated |
| 6 | Cable seized when aircraft in flight | Near | Near | Failure not indicated |
| 7 | Sensor permanently indicates target near | Near or far | Near | Failure not indicated |
| 8 | Sensor permanently indicates target far | Near or far | Far | Immediately |

As regards conditions 1 and 2 in Table 1, clearly there is no failure.

As regards conditions 3 and 4, it is apparent that the failure is detected immediately.

As regards conditions 5 and 6, it is not possible for the sensor system to detect a seized cable and hence separate manual checks must be carried out.

In condition 7, the sensor has failed by permanently providing a "target near" signal even though the target may be near or far. As will be appreciated, it is not possible for the sensor system to detect this failure, and as such separate system checks are required.

In condition 8, the sensor has again failed but in this case the sensor permanently indicates a "target far" condition whether the target is near or far. As will be appreciated, it is immediately apparent that a failure has occurred.

As will also be appreciated, it is not possible to distinguish between any conditions 3, 4 and 8.

With reference to FIGS. 3A to 3D there is shown a skew sensor mechanism 130 according to a first embodiment of the present invention.

The skew sensor mechanism (or sensor assembly) 130 has a sensor target 131 that is provided as part of a piston (or second part of the assembly) 132 a body 133 in the form of a hollow cylinder (or housing or first part of the assembly) 134, a resilient biasing means in the form of a spring 136, a first sensor 138 and a second sensor 139. The piston 132 has a first end 140 and a second end 142. The cable 24 is connected to the second end 142 of the piston 132. The cylinder 134 has a first end 144 and a second end 146. The sensor target 131 and the piston 132 are moveable within the cylinder 134. The spring 136 is positioned between the second end 142 of the piston 132 and the second end 146 of the cylinder 134. The first and second sensors 138, 139 are mounted on the outside of the cylinder 134.

Figure 3A:
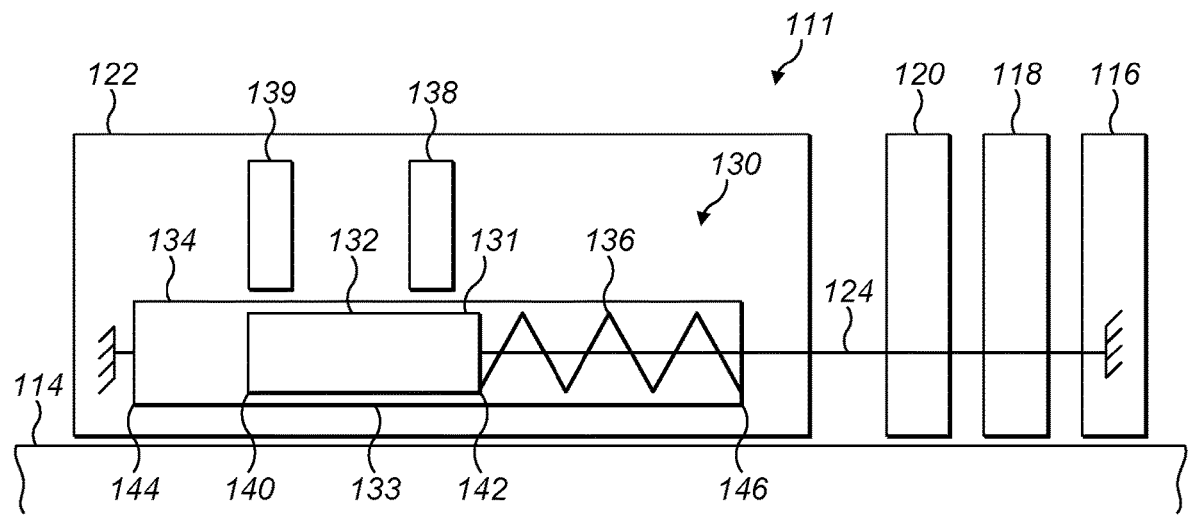
FIG. 3A is a schematic representation of a sensor assembly of a skew and/or loss detection system according to a first embodiment of the invention when the associated aircraft is on ground with the aircraft wing in a relaxed unloaded state.

The associated wing 111, leading edge 114, first slat 116, second slat 118, third slat 120 and fourth slat 122 are all shown schematically in FIG. 3a only.

The arrangement shown in FIG. 3A is representative of the associated aircraft (not shown) being on the ground such that the weight of the aircraft is on the wheels (not shown) and the aircraft wing 111 is in a relaxed unloaded state. In other words, the wing structure is supported by the wheels.

Each of the first sensor 138 and the second sensor 139 are in the 'target near' position or state, indicating a normal, non-operational (i.e. non flying) state.

Figure 3B:
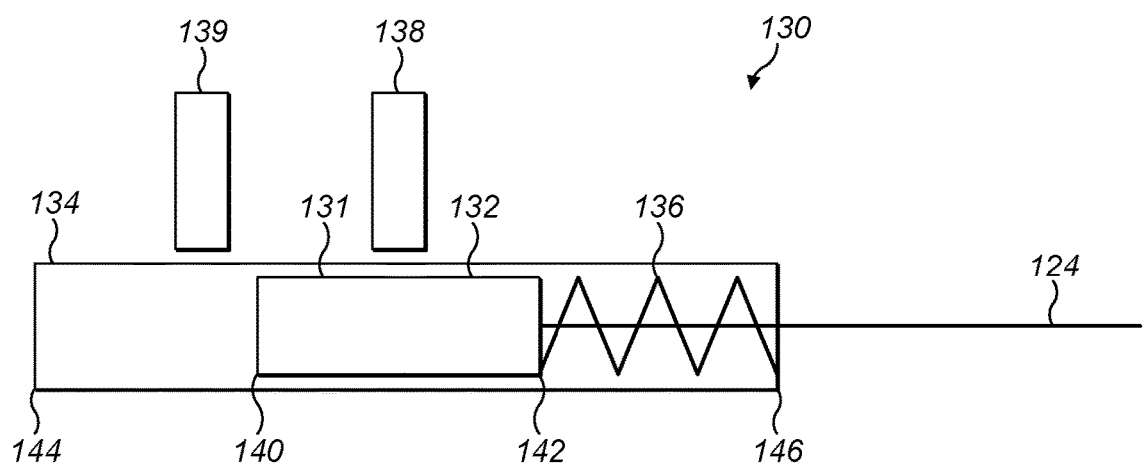
FIG. 3B is a schematic representation of the sensor assembly of FIG. 3A when the aircraft is in the air.

When the aircraft (not shown) takes off and the wing 111 bends up due to supporting the weight of the aircraft, it pulls the cable 124 as shown in FIG. 3B. The sensor target 131 is pulled to the right such that the spring is compressed between the second end 142 of the sensor target 131 and the second end 146 of the cylinder 134. In this state, the second sensor 139 is in the 'target far' position and the first sensor 138 is in the 'target near' position. The weight of the aircraft is not on the wheels at this time (i.e. the wing structure is supporting a load). The change in the position of the second sensor 139 is indicative that the first and second parts of the assembly have moved from a first relative position indicative that the wing is supported by the aircraft, in particular the wheels of the aircraft to a second relative position indicative that the wing is supporting a load (i.e. the wing is supporting the aircraft) and that the cable (or any other part of the sensor system) of the skew sensor mechanism 130 has not seized. Similarly, the change in where the weight of the aircraft is supported (from the wheels to the wing, i.e. not on the wheels) is indicative that the skew sensor mechanism 130 has not seized.

Figure 3C:
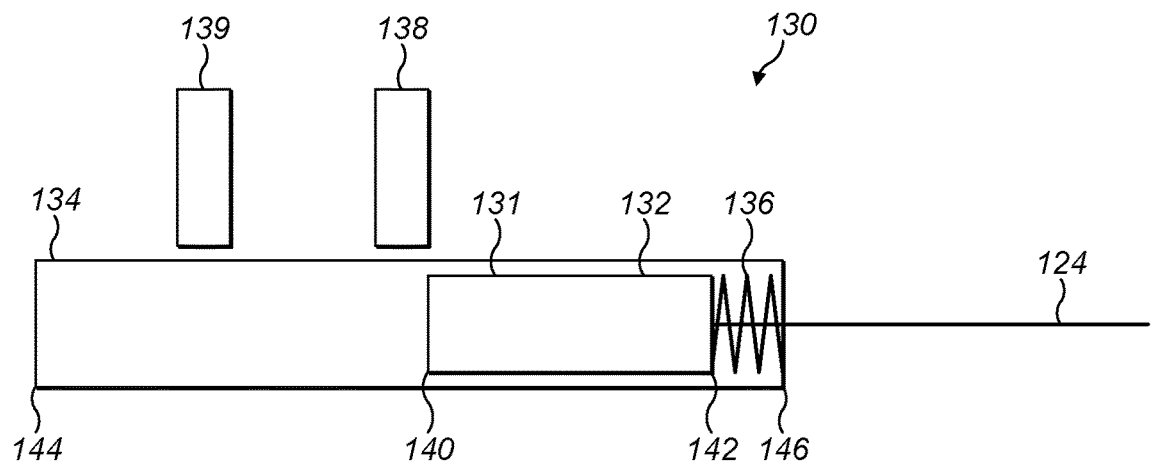
FIG. 3C is a schematic representation of the sensor assembly of FIG. 3A in a state in which panel skew has occurred.

With reference FIG. 3C, the arrangement of the skew sensor mechanism 130 is indicative that panel skew has occurred and that one or more of the slats is skewed or misaligned relative to the other slats. The panel skew has caused the cable 24 to be pulled to the right, compressing the spring 136 at the second end 146 of the cylinder 134. The sensor target 131 is thus moved away from the first sensor 138 and the second sensor 139, each of which indicates that the sensor target 131 has moved to a 'target far' state and hence it is possible to determine that panel skew has occurred. Note there is no overlap between the sensor target 131 and either of the sensors 138, 139 in this condition.

Figure 3D:
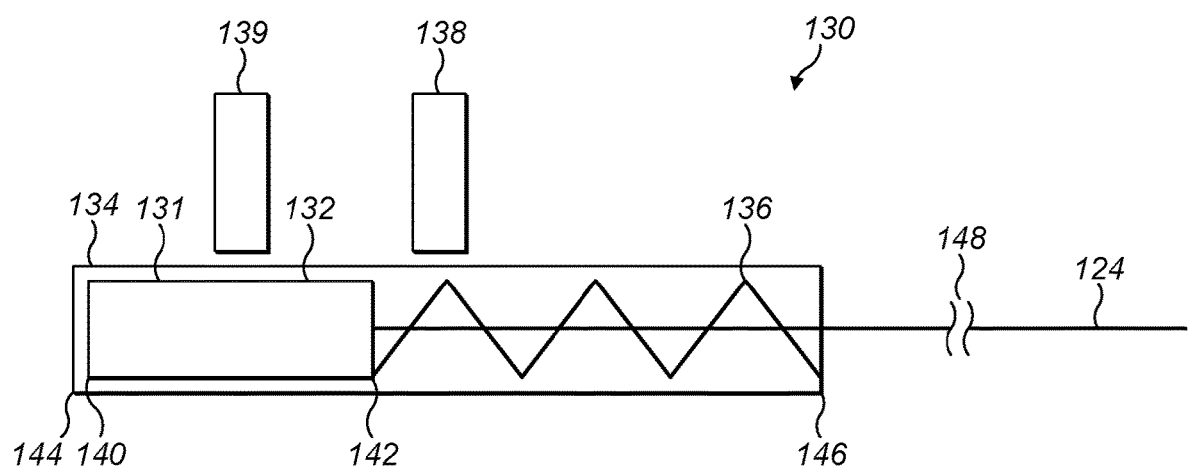
FIG. 3D is a schematic representation of the sensor assembly of FIG. 3A in a state in which cable failure has occurred.

With reference to FIG. 3D, the arrangement of the skew sensor mechanism 130 is indicative that the cable 124 has failed (i.e. is broken or disconnected). Following a break 148 in the cable 124, the spring 136 expands, thereby causing the sensor target 131 to move toward the first end 144 of the cylinder 134. The sensor target 131 is thus moved away from the first sensor 138, which is able to detect that the sensor target 131 has moved to a 'target far' state. The second sensor 13a is able to detect that the sensor target 131 is in a 'target near' state and hence it is possible to determine a broken cable.

The arrangement shown in FIGS. 3A to 3D allows a differentiation between a panel skew and a broken cable to be made.

The system 130 of FIGS. 3A to 3D advantageously removes the need for a manual latency failure check in respect of a seized mechanism.

Table 2 below shows various conditions with the associated first and second sensor actual target positions and indicated target positions together with when the failure is detected.

TABLE 2

| | Condition | 1st sensor (138) actual target position | Target Position as indicated by 1st sensor (138) | 2nd sensor (139) actual target position | Target position as indicated by 2nd sensor (139) | When failure detected |
|---|---|---|---|---|---|---|
| 1 | Normal ground (FIG. 3a) | Near | Near | Near | Near | n/a |
| 2 | Normal flight (FIG. 3b) | Near | Near | Far | Far | n/a |
| 3 | Skew (FIG. 3c) | Far | Far | Far | Far | Immediately |
| 4 | Cable break (FIG. 3d) | Far | Far | Near | Near | Immediately |
| 5 | Cable seized when aircraft on ground | Near | Near | Near | Near | On take-off |
| 6 | Cable seized when aircraft in flight | Near | Near | Far | Far | On landing |
| 7 | Sensor 1 permanently indicates target near | Near or far | Near | | | Failure not indicated |
| 8 | Sensor 1 permanently indicates target far | Near or far | Far | | | Immediately |
| 9 | Sensor 2 permanently indicates target near | | | Near or far | Near | On take-off |
| 10 | Sensor 2 permanently indicates target far | | | Near or far | Far | On landing |

As regards conditions 1 and 2 in table 2, clearly there is no failure.

As regards conditions 3 and 4, it is apparent that the failure is detected immediately.

As regards condition 5, this condition is detected upon take-off since in a fully functioning system upon take-off the second sensor target position should change to far but does not thereby indicating a seized cable.

As regards condition 6, during flight the seized cable is not detected, but upon landing the second sensor actual target position should change to near, but would not, thereby indicating a seized cable.

It is not possible for the sensor system to detect the failure as shown in condition 7, and as such separate system checks are required.

In condition 8, the failure is detected immediately.
In condition 9, the failure is detected upon take-off.
In condition 10, the failure is detected upon landing.

In a further embodiment, if cylinder 134 was longer such that piston 131 and target 132 moved left such that sensor 139 also indicated 'target far' state when the cable was broken, the sensor mechanism would still be able to detect panel skew or a broken cable but would not be able to determine which type of failure had occurred.

With reference to FIGS. 4A to 4D there is shown a skew sensor mechanism (or sensor assembly) 230 according to a second embodiment of the present invention.

The skew sensor mechanism 230 has a sensor target 231 that is provided as part of a piston (or second part of the mechanism or assembly) 232, a body 233 in the form of a hollow cylinder (or a housing or first part of the mechanism or assembly) 234, a resilient biasing means in the form of a spring 236, a first sensor 238 and a second sensor 239. The piston 232 has a first end 240 and a second end 242. The cable 224 is connected to the second end 242 of the piston 232. The cylinder 234 has a first end 244 and a second end 246. The sensor target 231 and the piston 232 are moveable within the cylinder 234. The spring 236 is positioned between the second end 242 of the piston 232 and the second end 246 of the cylinder 234. The first and second sensors 238, 239 are mounted on the outside of the cylinder 234.

Figure 4A:
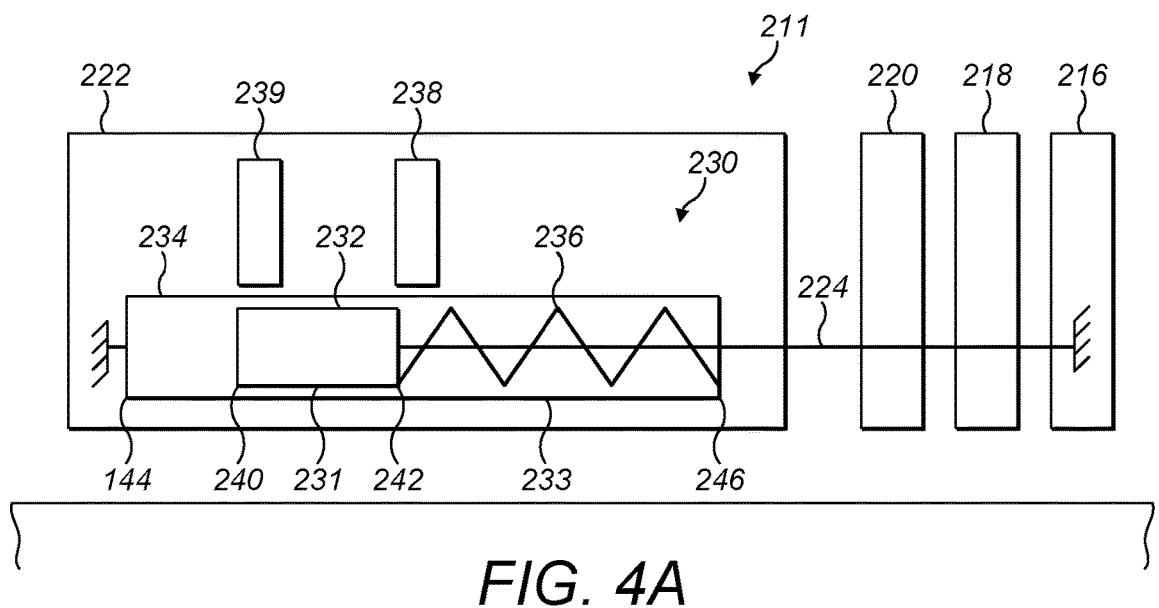
FIG. 4A is a schematic representation of a sensor assembly of a skew and/or loss detection system according to an alternative embodiment of the invention when the associated aircraft is on ground with the aircraft wing in a relaxed unloaded state.

The associated wing 211, leading edge 214, first slat 216, second slat 218, third slat 220 and fourth slat 222 are all shown schematically in FIG. 4a only.

The arrangement shown in FIG. 4A is representative of the associated aircraft (not shown) being on the ground such that the weight of the aircraft is on the wheels (not shown) and the aircraft wing 211 is in a relaxed unloaded state. In other words, the wing structure is supported.

In this embodiment, the first sensor 238 is in the 'target far' position or state and the second sensor 239 is in the 'target near' position or state, indicating normal, non-operational (i.e. non flying), condition.

Figure 4B:
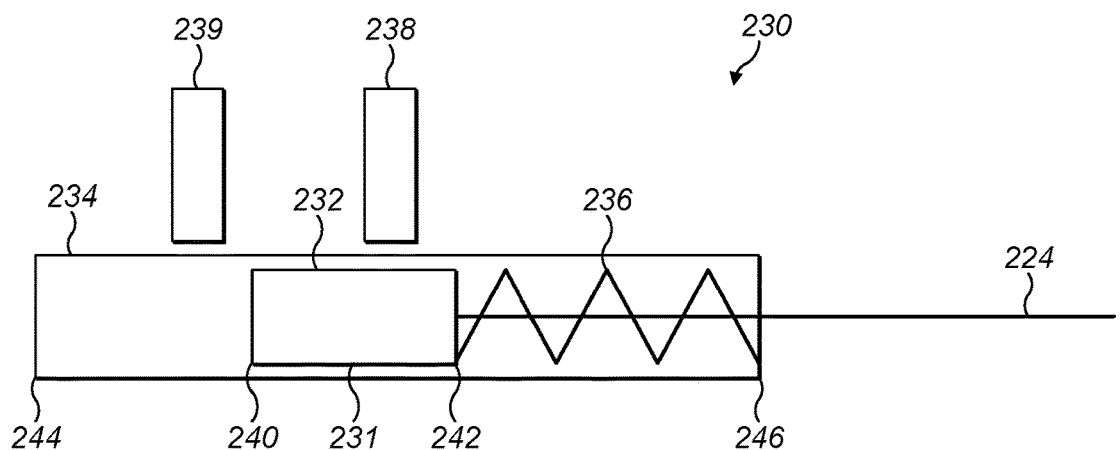
FIG. 4B is a schematic representation of the sensor assembly of FIG. 4A when the aircraft is in the air.

When the aircraft (not shown) takes off and the wing 211 bends up due to supporting the weight of the aircraft, it pulls the cable 224 as shown in FIG. 4B. The sensor target 232 is pulled to the right such that the spring is compressed between the second end 242 of the sensor target 232 and the second end 246 of the cylinder 234. In this state, the second sensor 239 changes to the 'target far' position and the first sensor 238 changes to the 'target near' position. The weight of the aircraft is not on the wheels at this time (i.e. the wing structure is supporting a load). The change in the position of each of the first sensor 238 and the second sensor 239 is indicative that the first and second parts of the assembly have moved from a first relative position indicative that the wing is supported to a second relative position indicative that the wing is supporting a load and that the cable of the skew sensor mechanism 230 has not seized. Similarly, the change in where the weight of the aircraft is supported (from the wheels to the wing, i.e. not on the wheels) is indicative that the skew sensor mechanism 230 has not seized.

Figure 4C:
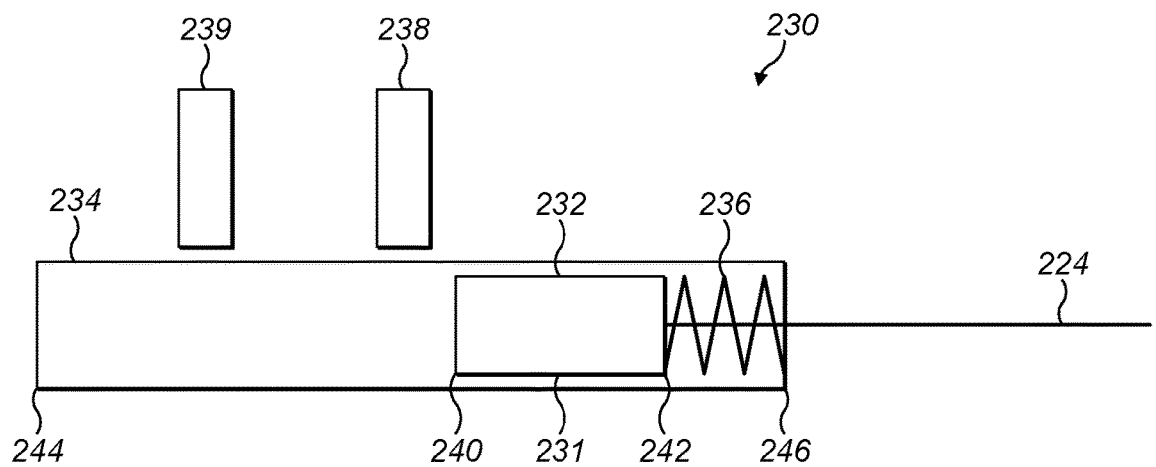
FIG. 4C is a schematic representation of the sensor assembly of FIG. 4A in a state in which panel skew has occurred.

With reference FIG. 4C, the arrangement of the skew sensor mechanism 230 is indicative that panel skew has occurred and that one or more of the slats is skewed or misaligned relative to the other slats. The panel skew has caused the cable 24 to be pulled to the right, compressing the spring 236 at the second end 246 of the cylinder 234. The sensor target 232 is thus moved further away from the first sensor 238 moved away from and the second sensor 239, such that each of the first sensor 238 and the second sensor 239 are able to detect that the sensor target 231 has moved to a 'target far' state and hence it is possible to determine a panel skew. Note there is no overlap between the sensor target 232 and either of the sensors 238, 239 in this condition.

Figure 4D:
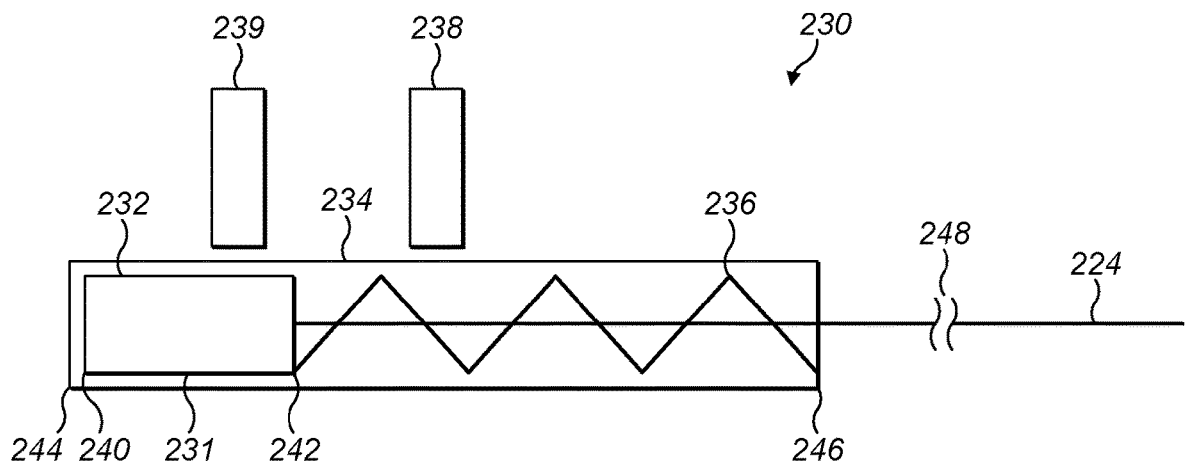
FIG. 4D is a schematic representation of the sensor assembly of FIG. 4A in a state in which cable failure has occurred.

With reference to FIG. 4D, the arrangement of the skew sensor mechanism 230 is indicative that the cable 224 has failed (i.e. is broken or disconnected). Following a break 248 in the cable 224, the spring 236 expands, thereby causing the sensor target 232 to move toward the first end 244 of the cylinder 234. The sensor target 231 is thus moved away from the first sensor 238, which is able to detect that the sensor target 232 has moved to a 'target far' state. The second sensor 239 is able to detect that the sensor target 231 is in a 'target near' state. Hence, during flight it is possible to determine that cable failure has occurred.

The arrangement shown in FIGS. 4A to 4D allows differentiation between failure due to panel skew and failure due to a broken cable.

The system 230 of FIGS. 4A to 4D, therefore, also advantageously removes the need for a manual latency failure check in respect of a seized mechanism.

Furthermore, since in this system both of the first sensor 238 and the second sensor 239 change state during normal operation (i.e. both change state between the aircraft being on the ground and flying), both mechanical failures (seizure and electrical failures of the sensors) cannot be latent for an interval greater than one flight.

Table 3 below shows various conditions together with the first and second sensor actual target position, indicated target position and when the failure is detected.

TABLE 3

| Condition | 1st sensor (238) actual target position | Target Position as indicated by 1st sensor (238) | 2nd sensor (239) actual target position | Target position as indicated by 2nd sensor (239) | When failure detected |
|---|---|---|---|---|---|
| 1 Normal ground (FIG. 4a) | Far | Far | Near | Near | n/a |
| 2 Normal flight (FIG. 4b) | Near | Near | Far | Far | n/a |
| 3 Skew (FIG. 4c) | Far | Far | Far | Far | Immediately |
| 4 Cable break (FIG. 4d) | Far | Far | Near | Near | In flight: Immediately, failure not indicated on ground |
| 5 Cable seized when aircraft on ground | Near | Near | Near | Near | On take-off |
| 6 Cable seized when aircraft in flight | Near | Near | Far | Far | On landing |
| 7 Sensor 1 permanently indicates target near | Near or far | Near | | | On landing |
| 8 Sensor 1 permanently indicates target far | Near or far | Far | | | On take-off |
| 9 Sensor 2 permanently indicates target near | | | Near or far | Near | On take-off |
| 10 Sensor 2 permanently indicates target far | | | Near or far | Far | On landing |

As can be seen from table 3, all failures are detectable. Condition 3, skew, is detectable both in flight and on the ground. Condition 4 cable brake is immediately detectable during flight but if the cable breaks when the aircraft is on the ground this failure is not indicated. The failures shown in conditions 5-10 are all detectable either on take-off or on landing.

In a further embodiment, if cylinder 234 was longer such that piston 231 and target 232 moved left such that sensor 239 also indicated 'target far' state when the cable was broken, the sensor mechanism would still be able to detect panel skew or cable failure, but would not be able to determine which type of failure had occurred.

The skew sensor mechanisms 130, 230 of FIGS. 3A to 3D and 4A to 4D are particularly advantageous as the components can be made relatively simple, robust and tolerant of the harsh environment within the aircraft surface.

Figure 5A:
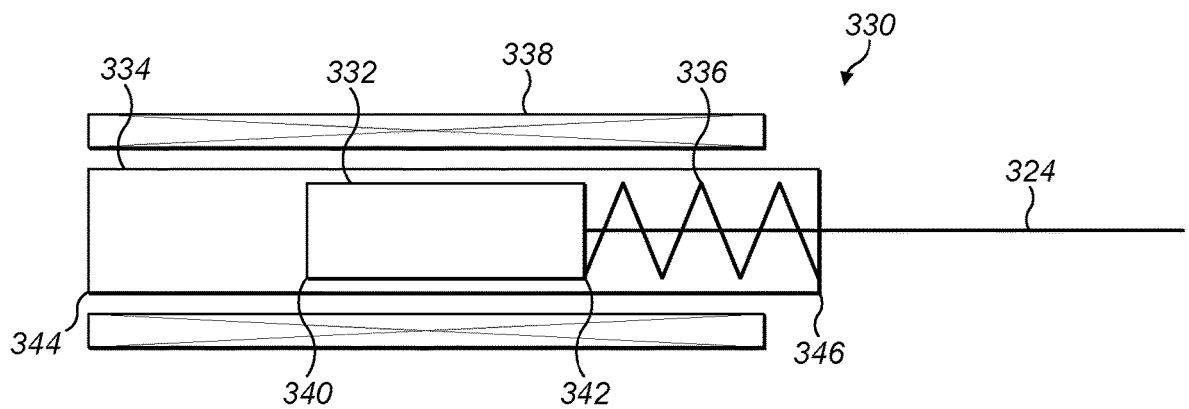
FIG. 5A is a schematic representation of a sensor assembly of a skew and/or loss detection system according to an alternative embodiment of the invention.

Referring to FIG. 5A there is an alternative embodiment of a skew sensor mechanism (or sensor assembly) 330. The skew sensor mechanism 330 has a sensor target (or second part) in the form of an armature 332, a hollow cylinder (or housing or first part) 334, a resilient biasing means in the form of a spring 336, and a continuous, linear sensor in the form of a Linear Variable Differential Transformer (LVDT) 338. Other continuous linear sensors could also be used. The armature 332 has a first end 340 and a second end 342. The cable 324 is connected to the second end 342 of the armature 332. The cylinder 334 has a first end 344 and a second end 346. The armature 332 is moveable within the cylinder 334. The spring 336 is positioned between the second end 342 of the armature 332 and the second end 346 of the cylinder 334. The sensor 338 is mounted on the outside of the cylinder 334.

Figure 5B:
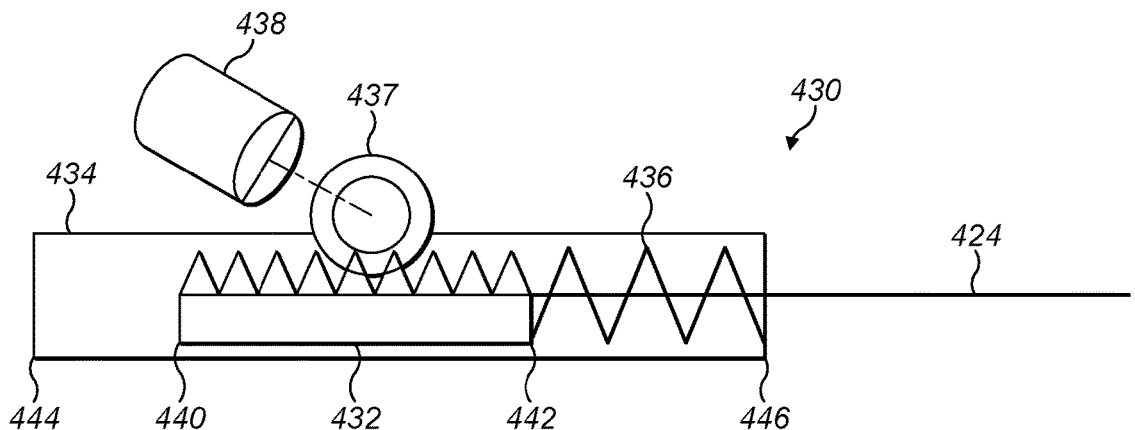
FIG. 5B is a schematic representation of a sensor assembly of a skew and/or loss detection system according to an alternative embodiment of the invention.

With reference to FIG. 5B there is a further embodiment of a skew sensor mechanism (or sensor assembly) 430. The skew sensor mechanism 430 has a sensor target (or second part) in the form of a rack 432, a hollow cylinder (or housing or first part) 434, a resilient biasing means in the form of a spring 436, a pinion 437 and a continuous, rotary sensor 438. Other means to convert linear to rotary sensor motion could be used. The rack 432 has a first end 440 and a second end 442. The cable 424 is connected to the second end 442 of the rack 432. The cylinder 434 has a first end 444 and a second end 446. The rack 432 is moveable within the cylinder 434. The spring 436 is positioned between the second end 442 of the rack 432 and the second end 446 of the cylinder 434. The rotary sensor 438 is mounted on the outside of the cylinder 434.

Figure 5C:
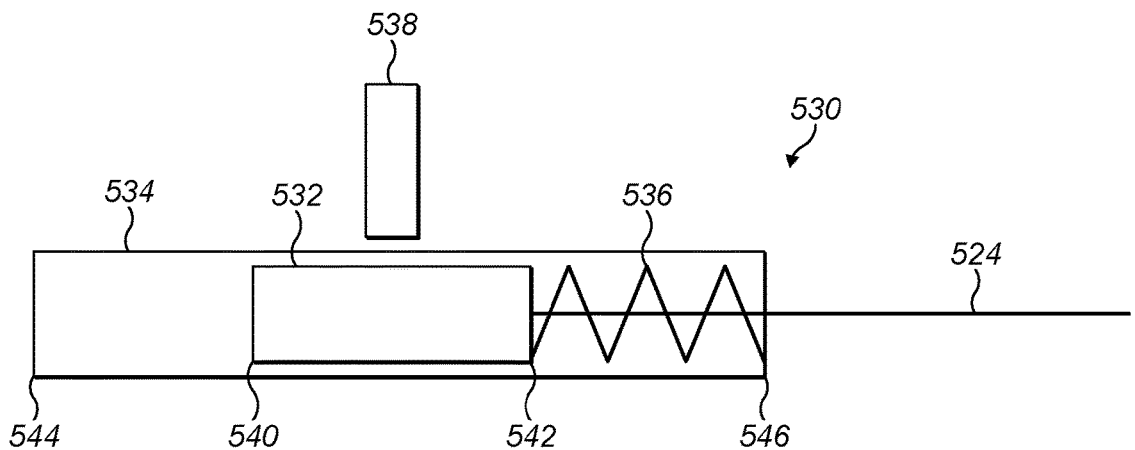
FIG. 5C is a schematic representation of a sensor assembly of a skew and/or loss detection system according to an alternative embodiment of the invention.

With reference to FIG. 5C there is a yet further embodiment of a skew sensor mechanism (or sensory assembly) 530. The skew sensor mechanism 530 has a sensor target (or second part) in the form of a grating style target 532, a hollow cylinder (or housing or first part) 534, a resilient biasing means in the form of a spring 536 and a detector 538. The target 532 has a first end 540 and a second end 542. The cable 524 is connected to the second end 542 of the target 532. The cylinder 534 has a first end 544 and a second end 546. The target 532 is moveable within the cylinder 534. The spring 536 is positioned between the second end 542 of the target 532 and the second end 546 of the cylinder 534. The detector 538 is mounted on the outside of the cylinder 534. In this embodiment, the sensor could be an optical sensor or an electromagnetic sensor. Other continuous grating style sensors could be used.

Each of the sensor assemblies 330, 430 and 530 are attached to the wing in a manner similar to that shown in FIGS. 3a to 4d.

With reference to FIGS. 6A to 6F there is shown a further embodiment of a skew sensor mechanism 630 in which components which fulfil the same or substantially the same function as those of skew sensor mechanism 130 are labelled 500 greater.

In this example the housing 633 is attached to the second slat 618. Cable 624 is attached at one end to first sensor target 631 and at an opposite end to first slat 616. A stop 650 prevents the first sensor target 631 moving further left than as shown in FIG. 6A.

The sensor assembly 630 also includes a second sensor target 631' and a third sensor 638'. A second cable 624' is attached at one end to the second sensor target 631' and at an opposite end to the fourth slat 622. The stop 650 prevents the second sensor target 631' moving further to the right than as shown in FIG. 6A.

FIG. 6A shows the relative position of the component when the associated aircraft is on the ground. All three sensors indicate target near.

FIG. 6B shows the relative position of the components with the associated aircraft in flight. In this case the first sensor 638 and second sensor 638' both indicate target near whereas the second sensor 639 indicates target far. FIG. 6B shows the normal flight condition.

FIG. 6C shows a condition where skew of first slat 616 has occurred. Under these circumstances the first sensor 638 indicates target far.

FIG. 6D shows the position of the components when skew of fourth slat 622 or third slat 620 has occurred. Under these circumstances the third sensor 638' indicates target far.

Figure 6E:
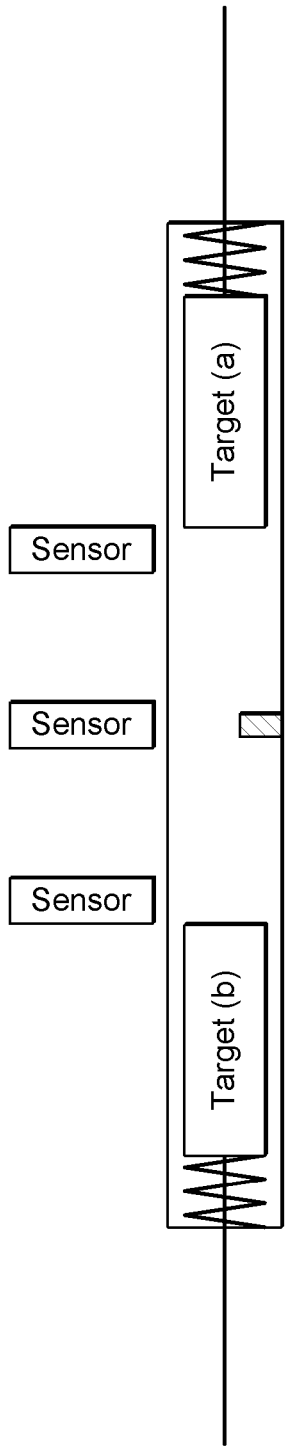

As shown in FIG. 6E, all three sensors indicate target far showing either skew of the second slat 618 or skew of both the first slat 616 and one or both of the third and fourth slats.

Figure 6F:
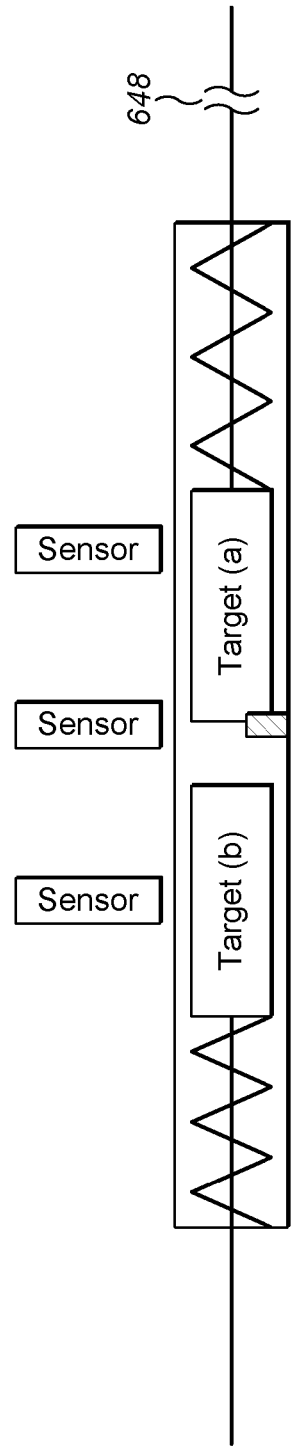

FIG. 6F shows failure of cable 624 during flight. Thus all sensors are indicating target near.

Longer wings tend to flex more during normal operation and the difference between the wing flex which pulls the cable during normal operation and the amount of pull during a true skew event can overlap. The embodiment shown in FIGS. 6A to 6F overcomes this problem by adding further skew sensors. In this case there are two targets and three sensors. Sensor 639 acts as a proximity sensor in respect of both the first sensor target 631 and the second sensor target 631'.

FIGS. 7A and 7B show respective side and plan views of a skew sensor mechanism (or sensor assembly) 730 in which components that fulfil the same or substantially the same function as those of skew sensor mechanism 630 are labelled 100 greater. Skew sensor mechanism 730 does not have an equivalent to stop 650 but, as can be seen from FIG. 7B, the targets are allowed to overlap each other thereby ensuring the cable 724 and 724' are always under tension.

Each of the sensor assemblies 330, 430, 530, 630, 730 are configured to detect a first relative position of the first and second parts that is indicative of the wing structure supporting a load and a second relative position of the first and second parts that is indicative that the wing structure is supported. Each of the sensor assemblies 330, 430 and 530 is configured to detect the relative position of a first and second part that is indicative of skew. Each of the sensor assemblies 330, 430, 530, 630, 730 are configured to detect a relative position of a first and second part that is indicative of a failure of the respective cable 324, 424, 524, 624, 724.

Variations fall within the scope of the present invention.

Skew and/or loss of one of any number of surfaces can be detected with the aforementioned invention.

The skew sensor mechanism can be positioned in any of the surfaces within the control surface element skew and/or loss detection system. As shown in FIGS. 3a and 4a, the appropriate skew sensor mechanism is associated with four control surface elements (in these cases four slats) though in further embodiments these skew sensor mechanisms can be associated with more or less than four control surfaces.

Although the invention has been described in relation to slats associated with the leading edge, the invention is equally applicable to flaps (trailing edge) as well as other control surface elements.

The invention claimed is:

1. An aircraft control surface skew and/or loss detection system, comprising:
   an aircraft wing structure having a fixed part and at least two control surface elements wherein the at least two control surface elements are configured to be moveable relative to the fixed part;
   a cable operably connected to each of the at least two control surface elements such that a tensile force is applied to the cable upon skew and/or loss of one of the control surface elements;
   a sensor assembly having a first part and a second part, wherein one of the first and second parts has a sensor and wherein the cable is coupled to the other of the first and second parts such that skew and/or loss of one of the control surface elements causes movement of the second part relative to the first part;
   the sensor being configured to detect a first relative position of the first and second parts indicative of the wing structure supporting a load;
   the sensor being configured to detect a second relative position of the first and second parts indicative of the wing structure being supported;
   wherein the sensor includes a first sensor configured to detect when the first and second parts are within a first range of relative positions; and
   wherein the sensor includes a second sensor configured to detect when the first and second parts are within a second range of relative positions.

2. The aircraft control surface skew and/or loss detection system as defined in claim 1, wherein the sensor is configured to detect a third relative position of the first and second parts indicative of skew and/or loss of one of the control surface elements.

3. The aircraft control surface skew and/or loss detection system as defined in claim 2, wherein the sensor is configured to detect a fourth relative position of the first and second parts indicative of a loss of a tensile force in the cable.

4. The aircraft control surface skew and/or loss detection system as defined in claim 1, wherein the first sensor is incapable of detecting the relative positions of the first and second parts when the first and second parts are outside of the first range.

5. The aircraft control surface skew and/or loss detection system as defined in claim 1, wherein the second sensor is incapable of detecting the relative positions of the first and second parts when the first and second parts are outside of the second range.

6. The aircraft control surface skew and/or loss detection system as defined in claim 1, wherein the first range overlaps the second range.

7. The aircraft control surface skew and/or loss detection system as defined in claim 1, wherein the first range does not overlap the second range.

8. The aircraft control surface skew and/or loss detection system as defined in claim 1, wherein:
   the sensor is configured to detect a third relative position of the first and second parts indicative of skew and/or loss of one of the control surface elements;
   the sensor is configured to detect a fourth relative position of the first and second parts indicative of a loss of a tensile force in the cable; and
   one of the third relative position and fourth relative position is outside one of the first and second ranges and inside the other of the first and second ranges.

9. The aircraft control surface skew and/or loss detection system as defined in claim 8, wherein the other of the third relative position and the fourth relative position is inside said one of the first and second ranges and outside of said other of the first and second ranges.

10. The aircraft control surface skew and/or loss detection system as defined in claim 8, wherein the other of the third relative position and the fourth relative position is outside of both the first and second ranges.

11. The aircraft control surface skew and/or loss detection system as defined in claim 1, wherein the sensor includes a continuous sensor.

12. The aircraft control surface skew and/or loss detection system as defined in claim 11, wherein the continuous sensor is a linear sensor.

13. The aircraft control surface skew and/or loss detection system as defined in claim 12, wherein the linear sensor is a linear variable differential transformer.

14. The aircraft control surface skew and/or loss detection system as defined in claim 11, wherein the continuous sensor is a rotary sensor.

15. The aircraft control surface skew and/or loss detection system as defined in claim 14, wherein the rotary sensor includes means to convert linear to rotary motion.

16. The aircraft control surface skew and/or loss detection system as defined in claim 11, wherein the continuous sensor is a sensor that detects the continuous position of a grating.

17. The aircraft control surface skew and/or loss detection system as defined in claim 1, wherein the sensor detecting the second relative position when the wing structure is being supported is indicative of a failure of the detection system.

18. The aircraft control surface skew and/or loss detection system as defined in claim 1, wherein the sensor detecting the first relative position when the wing structure is supporting a load is indicative of a failure of the detection system.

19. The aircraft control surface skew and/or loss detection system as defined in claim 1, wherein the first part is mounted on one of the control surface elements.

20. An aircraft control surface skew and/or loss detection system, comprising:
   an aircraft wing structure having a fixed part and at least two control surface elements wherein the at least two control surface elements are configured to be moveable relative to the fixed part;
   a cable operably connected to each of the at least two control surface elements such that a tensile force is applied to the cable upon skew and/or loss of one of the control surface elements;
   a sensor assembly having a first part and a second part, wherein one of the first and second parts has a sensor and wherein the cable is coupled to the other of the first and second parts such that skew and/or loss of one of the control surface elements causes movement of the second part relative to the first part;
   the sensor being configured to detect a first relative position of the first and second parts indicative of the wing structure supporting a load;
   the sensor being configured to detect a second relative position of the first and second parts indicative of the wing structure being supported;
   a further control surface element wherein the further control surface element is configured to be moveable relative to the fixed part;
   a further cable operably connected to the further control surface element and to one of the at least two control surface elements such that a tensile force is applied to the further cable upon skew and/or loss of the further control surface element and/or one of the at least two control surface elements;
   the sensor assembly comprising a third part wherein the further cable is coupled to the third part such that skew and/or loss of the further control surface element and/or one of the at least two control surface elements causes movement of the third part relative to the first part;
   the sensor being configured to detect a first relative position of the first and third parts indicative of the wing structure supporting a load; and
   the sensor being configured to detect a second relative position of the first and third parts indicative of the wing structure being supported.

21. The aircraft control surface skew and/or loss detection system as defined in claim 20, wherein the sensor is configured to detect a third relative position of the first and third parts indicative of skew and/or loss of the further control surface element and/or one of the at least two control surface elements.

22. The aircraft control surface skew and/or loss detection system as defined in claim 21, wherein the sensor is configured to detect a fourth relative position of the first and third parts indicative of a loss of a tensile force in the further cable.

23. The aircraft control surface skew and/or loss detection system as defined in claim 20, wherein the sensor includes a further second sensor configured to detect when the first and third parts are within a further first range of relative positions.

24. The aircraft control surface skew and/or loss detection system as defined in claim 23, wherein the further second sensor is incapable of detecting the relative position of the first and third parts when the first and third parts are outside of the further first range.

25. A method of operating an aircraft including an aircraft control surface skew and/or loss detection system as defined in claim 1, comprising the steps of:
   detecting an initial relative position of the first and second parts when the wing structure is supporting a load;
   detecting a secondary relative position of the first and second parts when the wing structure is being supported; and
   detecting at least one of correct alignment of the at least two control surface elements, mis-alignment of one of the control surface elements, and failure of the detection system.

26. The method as defined in claim 25, wherein detecting failure of the detection system includes the step of detecting loss of a tensile force in the cable or detecting an alternative failure of the detection system.

* * * * *